(12) United States Patent
Sarafian

(10) Patent No.: US 7,852,260 B2
(45) Date of Patent: Dec. 14, 2010

(54) METHODS AND SYSTEMS FOR GENERATING VIRTUAL RADAR TARGETS

(75) Inventor: Gideon Sarafian, Rishon LeZion (IL)

(73) Assignee: Israel Aerospace Industries Ltd., Lod (IL)

( * ) Notice: Subject to any disclaimer, the term of this patent is extended or adjusted under 35 U.S.C. 154(b) by 121 days.

(21) Appl. No.: 12/282,297

(22) PCT Filed: Mar. 1, 2007

(86) PCT No.: PCT/IL2007/000266

§ 371 (c)(1),
(2), (4) Date: Sep. 9, 2008

(87) PCT Pub. No.: WO2007/113790

PCT Pub. Date: Oct. 11, 2007

(65) Prior Publication Data

US 2009/0058715 A1  Mar. 5, 2009

(30) Foreign Application Priority Data

Apr. 3, 2006  (IL) ..................................... 174746

(51) Int. Cl.
*G01S 7/40* (2006.01)
(52) U.S. Cl. ...................... 342/169; 342/165
(58) Field of Classification Search .................. 342/169
See application file for complete search history.

(56) References Cited

U.S. PATENT DOCUMENTS

| | | | |
|---|---|---|---|
| 3,254,340 A | 5/1966 | Sealander | |
| 3,898,662 A * | 8/1975 | Horn et al. | ..................... 342/15 |
| 3,906,500 A * | 9/1975 | Redman | ..................... 342/167 |
| 4,168,502 A * | 9/1979 | Susie | ..................... 342/172 |
| 4,204,342 A | 5/1980 | Linfield | |

(Continued)

FOREIGN PATENT DOCUMENTS

DE  101 12 894 A1  10/2002

(Continued)

OTHER PUBLICATIONS

"Flyable Fiber-Optic Radar Target Generator" XP000420578 ISSN: 0885-8985, by M. Mike Prcic. IEEE AES Systems Magazine, vol. 9, Jan. 1994, pp. 17-20.

(Continued)

*Primary Examiner*—Thomas H Tarcza
*Assistant Examiner*—Matthew M Barker
(74) *Attorney, Agent, or Firm*—Oliff & Berridge, PLC

(57) ABSTRACT

This application is directed to a virtual radar target generator and a method of operating thereof. The virtual radar target generator includes a transceiver and a controller coupled to the transceiver. The transceiver includes a transmission antenna and is adapted to receive a signal transmitted from a radar antenna, store signal information representative of the received signal within a digital radio frequency memory, and transmit an output signal representative of a virtual target such that at least a fraction of the output is received by the radar antenna. The transmission antenna and the radar antenna are positioned within a space that is at least partially defined by a radome. The transmission antenna transmits the output signal toward the radome such that at least a fraction of the output signal is reflected toward the radar antenna.

19 Claims, 12 Drawing Sheets

U.S. PATENT DOCUMENTS

| | | | |
|---|---|---|---|
| 4,424,038 A | | 1/1984 | Tingleff et al. |
| 4,450,447 A | | 5/1984 | Zebker et al. |
| 4,644,357 A | | 2/1987 | Schaaf et al. |
| 4,686,534 A | | 8/1987 | Eddy |
| 4,768,914 A | | 9/1988 | Sing |
| 4,969,819 A | | 11/1990 | James |
| 5,047,782 A | * | 9/1991 | Lew et al. .................. 342/169 |
| 5,223,840 A | | 6/1993 | Cronyn |
| 5,283,585 A | * | 2/1994 | Kneale ....................... 342/169 |
| 5,371,505 A | * | 12/1994 | Michaels ..................... 342/360 |
| 5,384,572 A | * | 1/1995 | Michaels et al. ............ 342/169 |
| 5,428,530 A | | 6/1995 | Brown et al. |
| 5,431,568 A | | 7/1995 | Fey et al. |
| 5,457,463 A | | 10/1995 | Vencel et al. |
| 5,518,400 A | * | 5/1996 | Otoide et al. .................. 434/4 |
| 5,807,109 A | | 9/1998 | Tzidon et al. |
| 5,892,479 A | * | 4/1999 | Mills et al. .................. 342/172 |
| 6,053,737 A | | 4/2000 | Babbitt et al. |
| 6,067,041 A | | 5/2000 | Kaiser et al. |
| 6,075,480 A | * | 6/2000 | Deliberis, Jr. ............... 342/169 |
| 6,346,909 B1 | * | 2/2002 | Johnson et al. ............. 342/169 |
| 6,498,583 B1 | * | 12/2002 | Tsai et al. ................... 342/169 |
| 6,646,592 B2 | * | 11/2003 | Matsuoka ................... 342/134 |
| 6,686,872 B2 | * | 2/2004 | Vacanti ....................... 342/173 |
| 6,788,273 B1 | * | 9/2004 | Schultz et al. .............. 343/909 |
| 6,954,172 B2 | * | 10/2005 | Hofmann et al. ............ 342/173 |
| 7,145,504 B1 | * | 12/2006 | Newberg et al. ............ 342/169 |
| 7,242,346 B1 | * | 7/2007 | Slutzky et al. .............. 342/169 |
| 7,327,308 B2 | * | 2/2008 | Cheng et al. ................ 342/165 |
| 2002/0039085 A1 | | 4/2002 | Ebersole et al. |
| 2002/0098890 A1 | | 7/2002 | Sakaguchi |
| 2003/0118971 A1 | | 6/2003 | Rogachev |
| 2003/0214533 A1 | | 11/2003 | Cull et al. |
| 2004/0029081 A1 | | 2/2004 | Jaros et al. |
| 2006/0005077 A1 | | 1/2006 | Miller |
| 2007/0098529 A1 | | 5/2007 | Xiang et al. |

FOREIGN PATENT DOCUMENTS

| | | |
|---|---|---|
| FR | 2 485 207 A1 | 6/1980 |
| GB | 2 405 761 A | 3/2005 |
| JP | A-1-253787 | 10/1989 |
| RU | 2 193 747 C1 | 11/2002 |

OTHER PUBLICATIONS

"Basic functional requirements and results for an MSSR on-site evaluator based on RF target injection", by J.L. Vazquez et al. IEE Proc.-Radar Sonar Navig., vol. 145, No. 6, Dec. 1998, pp. 361-366.

* cited by examiner

METHODS AND SYSTEMS FOR GENERATING VIRTUAL RADAR TARGETS

FIELD OF THE INVENTION

The present invention relates to systems and methods for generating virtual radar targets.

BACKGROUND OF THE INVENTION

Most airborne radars are pulsed radars. Pulsed radars can detect and acquire targets such as airborne, ship borne or ground targets by transmitting radio frequency pulses (also referred to as signals), receiving radio frequency pulses that are reflected from the targets and analyzing the received radio frequency pulses.

The amplitude of the received radio frequency pulses is proportional to $R^{-4}$ (R being the radial distance between the radar antenna and the target) as well as to the radar cross section of the target. The frequency of the received radio frequency pulse is affected by a frequency shift that is proportional to the frequency of the transmitted radio frequency pulse and to the relative velocity between the radar and the target (what is known as the Doppler shift). The delay between a transmission of a radio frequency pulse and the reception of that radio frequency pulse is proportional to $2*R$.

In a typical scenario a target is illuminated by one or more sequences of radio frequency pulses and reflects multiple sequences of radio frequency pulses. The radar analyzes the received radio frequency pulses by correlating between (i) the delay period between a transmission and a reception of the reflected radio frequency pulses. If the change of distance does match the velocity, the radar characterizes the detected target as a normal target. (ii) the velocity (and even acceleration) of the target as reflected by the Doppler shift frequency of the received sequences of radio frequency pulses, and (iii) the change of distance between the radar and the target as reflected by the change in amplitude of the received sequences of radio frequency pulses. In order to simulate a target, various conditions should be fulfilled. Some of these conditions include correlating between the frequency shift of a received radio frequency pulse, the delay period between a transmission and reception of the radio frequency pulse and the amplitude difference between the transmitted radio frequency pulse and the received radio frequency pulse.

U.S. Pat. No. 6,067,041 of Kaiser, et al. titled "Moving target simulator" describes a ground-based system for testing a radar system. The system is positioned in the field of view of the radar and is capable of simulating a target that can radially move along a fixed angle in relation to the radar. The system is relatively large and may include a personal computer.

The system of Kaiser includes: (i) a radio frequency receiver, (ii) a digital radio frequency memory in electrical communication with the radio frequency receiver for storing a signal received thereby, (iii) a digital delay circuit in electrical communication with the digital radio frequency memory for providing a time delay between reception and transmission of the radio frequency signal, (iv) an amplitude modulation circuit in electrical communication with the digital radio frequency memory for modulating an amplitude of the radio frequency signal, (v) a Doppler modulation circuit in electrical communication with the digital radio frequency memory for providing a Doppler-modulated signal that represents a simulated target with simulated linearly changing velocity wherein the simulated range changes parabolically, and (vi) a radio frequency transmitter for transmitting the radio frequency signal after it has been delayed, amplitude-modulated, and/or Doppler-modulated.

The following patents and patent applications, all being incorporated herein by reference describe prior art systems that are used to train radar users: U.S. Pat. No. 5,223,840 of Cronyn titled "Low cost radar target simulator for remote radar testing"; U.S. Pat. No. 4,686,534 of Eddy titled "Retro directive radar and target simulator beacon apparatus and method"; U.S. Pat. No. 5,457,463 of Vencel et al. titled "Radar return signal simulator"; U.S. Pat. No. 4,450,447 of Zebker et al. titled "Synthetic aperture radar target simulator"; U.S. Pat. No. 4,424,038 of Tingleff et al. titled "Inflight aircraft training system", U.S. Pat. No. 5,428,530 of Brown et al. titled "Airborne reactive threat simulator"; U.S. Pat. No. 5,431,568 of Fey et al. titled "Radar target generator"; U.S. Pat. No. 3,254,340 of Sealander titled "Apparatus for coupling a return signal simulator to a radar unit"; U.S. Pat. No. 4,644,357 of Schaaf et al. titled "Radar clutter simulator"; U.K. patent application GB2405761 of Mussell et al. titled "Complex radar target simulator"; Russian patent RU2193747 of Chubar et al titled "Air target simulator" and Japanese patent JP1253787 of Matsuura et al titled "Reproducing method for dummy visual field for training simulator".

A radar antenna generates an antenna beam that scans in azimuth and in elevation to cover a desired field of view. Typical azimuth scan patterns cover a range of multiple degrees (for example, twenty, sixty, eighty degrees) while typical elevation scan patterns include one or more bars, equivalent to multiple degrees (for example, three four and ten degrees)

The scanning is typically achieved by mechanically moving the radar antenna. Electronic scanning with antenna at a fixed position (for example in phased array antennas) is usually implemented in ground-based radars or relatively large surveillance aircrafts.

Many aircrafts have a slotted planar array antenna that is located at the nose, belly, roof or tail of the aircraft and is protected by a radome. A slotted array antenna includes a slotted plane that includes a very large number of slots wherein each slot acts as a simple antenna element. The slotted plane is connected to a network of microwave waveguides. This antenna is moved by one or more servo-electrical motors. Typically, one servo-electrical motor performs horizontal scans while another servo-electrical motor performs elevation scans. The servo-motors are usually connected to a pedestal that in turn is connected to an aircraft airframe. Typically, a roll-and-pitch stabilized radar scan generator controls the scanning pattern of the radar antenna.

Many airborne radars are multi-mode radars. They can operate in several operational modes such as air-to-air modes, air-to-surface modes and sub-modes. Each mode may be characterized by a different scanning pattern. Thus, the field of view, angular scanning speed, and the number of bars can alter from mode to mode.

In addition, the characteristics of the transmitted radio frequency pulse sequences can vary from one mode to another. Some modes are characterized by low pulse repetition frequency (PRF), some are characterized by high pulse repetition frequency and others are characterized by medium pulse repetition frequency.

There is a need for systems and methods for generating virtual targets and especially for operating as non-intrusive systems.

SUMMARY OF THE INVENTION

According to various embodiments of the invention a virtual target generator is provided. The virtual targets generator includes a transceiver and a controller coupled to the transceiver. The transceiver is adapted to receive a signal transmitted from a radar antenna, to store signal information representative of the received signal within a digital radio frequency memory, and transmit an output signal representative of a virtual target such that at least a fraction of the output is received by the radar antenna. The controller is adapted to determine a timing of the transmission of the output signal in response to a virtual distance between the virtual target and the radar antenna, a required virtual target direction and direction information representative of a direction of the radar antenna.

Conveniently, the transceiver is an airborne transceiver and the radar antenna is an airborne antenna.

Conveniently, the transceiver includes a transmitting antenna that is positioned within a near-field region of the radar antenna, within a space that is at least partially defined by a radome.

Conveniently, the transmission antenna transmits the output signal towards the radome such that at least a fraction of the output signal is reflected towards the radar antenna and part of it is electromagnetically free space loosely coupled to the radar antenna.

Conveniently, the transceiver includes a receiving antenna that is positioned, within a near-field region of the radar antenna, within a space that is at least partially defined by a radome.

Conveniently, the system is adapted to transmit multiple signals representative of multiple virtual targets.

Conveniently, the transmission antenna is connected to the radome.

Conveniently, the transmission antenna is placed beyond the radar antenna.

Conveniently, the virtual target generator is further adapted to generate virtual targets that perform movements that have a longitudinal and or tangential component in relation to the radar.

According to various embodiments of the invention a method for simulating virtual targets is provided. The method includes: receiving a signal transmitted from a radar antenna; storing signal information within a digital radio frequency memory; receiving direction information representative of a direction of a radar antenna; determining a timing of a transmission of an output signal representative of a virtual target in response to a required virtual target direction and the received direction information; and transmitting, in response to the determination, the output signal such that at least a fraction of the output signal is received by the radar antenna.

Conveniently, the transmitting includes transmitting the output signal by an airborne transceiver.

Conveniently, the stage of transmitting includes transmitting the output signal by a transmission antenna positioned within a near-field region of the radar antenna.

Conveniently, the stage of transmitting includes transmitting the output signal by a transmission antenna; wherein the transmission antenna and the radar antenna are positioned within a space that is at least partially defined by a radome.

Conveniently, the stage of transmitting includes transmitting the output signal towards the radome such that at least a fraction of the output signal is reflected towards the radar antenna and a fraction of output signal is electromagnetically coupled to the radar antenna.

Conveniently, the stage of transmitting includes transmitting multiple signals representative of multiple virtual targets.

Conveniently, the stage of determining of the timing is responsive to a required virtual movement that includes a tangential or longitudinal component in relation to the radar.

BRIEF DESCRIPTION OF THE DRAWINGS

The invention is herein described, by way of example only, with reference to the accompanying drawings, wherein.

DETAILED DESCRIPTION OF THE DRAWINGS

A virtual target generator and a method for simulating targets are provided. The system and method can simulate virtual targets that can perform tangential (also referred to as lateral) movements, radial movement or a combination of both. The method includes: (i) receiving a signal from a radar antenna, (ii) storing within a digital radio frequency memory information, and (iii) generating an output signal representative of a virtual target by performing multiple operations such as retrieval of stored information and/or modulation of the retrieved information wherein the timing of a transmission of the output signal is responsive to a required virtual target direction, and in response to the received direction information.

Conveniently, the method and the virtual target generator are capable of performing direction simulation.

Conveniently, the method and virtual target generator can generate an output signal representative of one or more virtual targets that move substantially in any direction. The virtual movements of the virtual targets can have radial and/or tangential components.

The output signal is a radio frequency signal. It may be in the form of a pulse, a pulse sequence and the like.

Conveniently, the number of virtual targets that are generated, their characteristics (velocity, direction, acceleration, and the like) can be determined in various manners, including real-time determination via a data link, a pre-programmed flight profile determination, and the like.

Conveniently, the transmissions from the virtual target generator are received by the radar antenna by partial radome reflections and/or by sideway antenna wave dispersions.

DETAILED DESCRIPTION OF THE DRAWINGS

Figure 1:
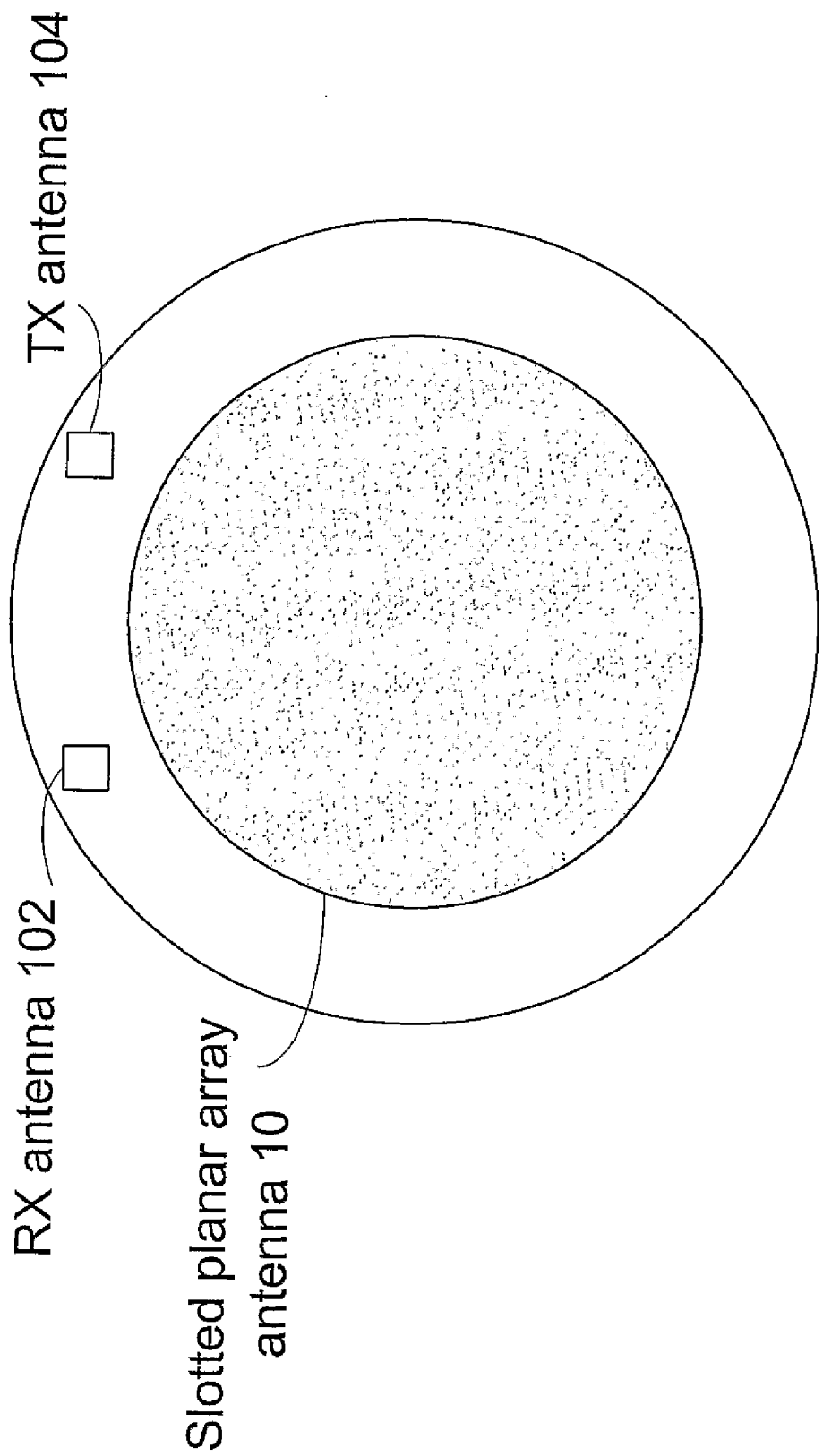
FIG. 1 illustrates an airborne radar antenna, a receiving antenna and a transmitting antenna, according to an embodiment of the invention.
Figure 2:
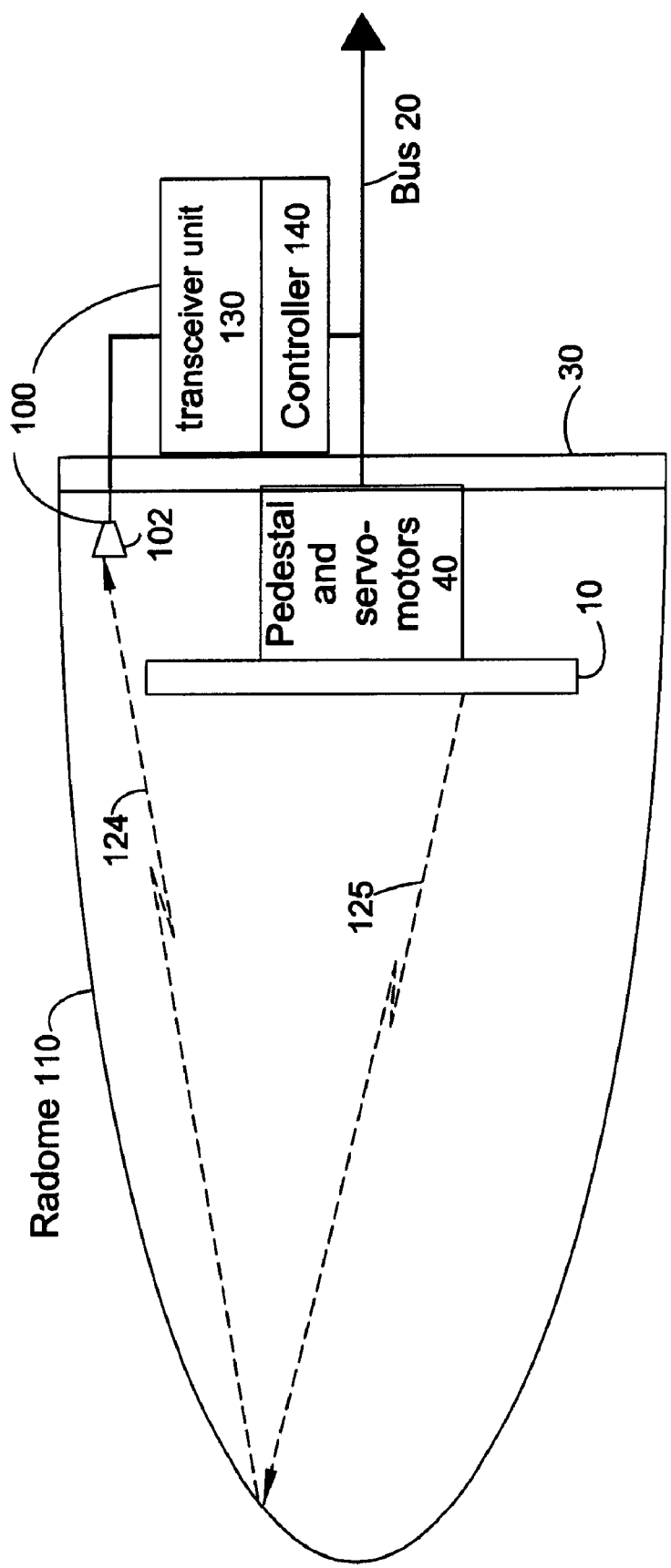
FIGS. 2-3 illustrate an airborne virtual target generator and its environment, according to an embodiment of the invention.
Figure 3:
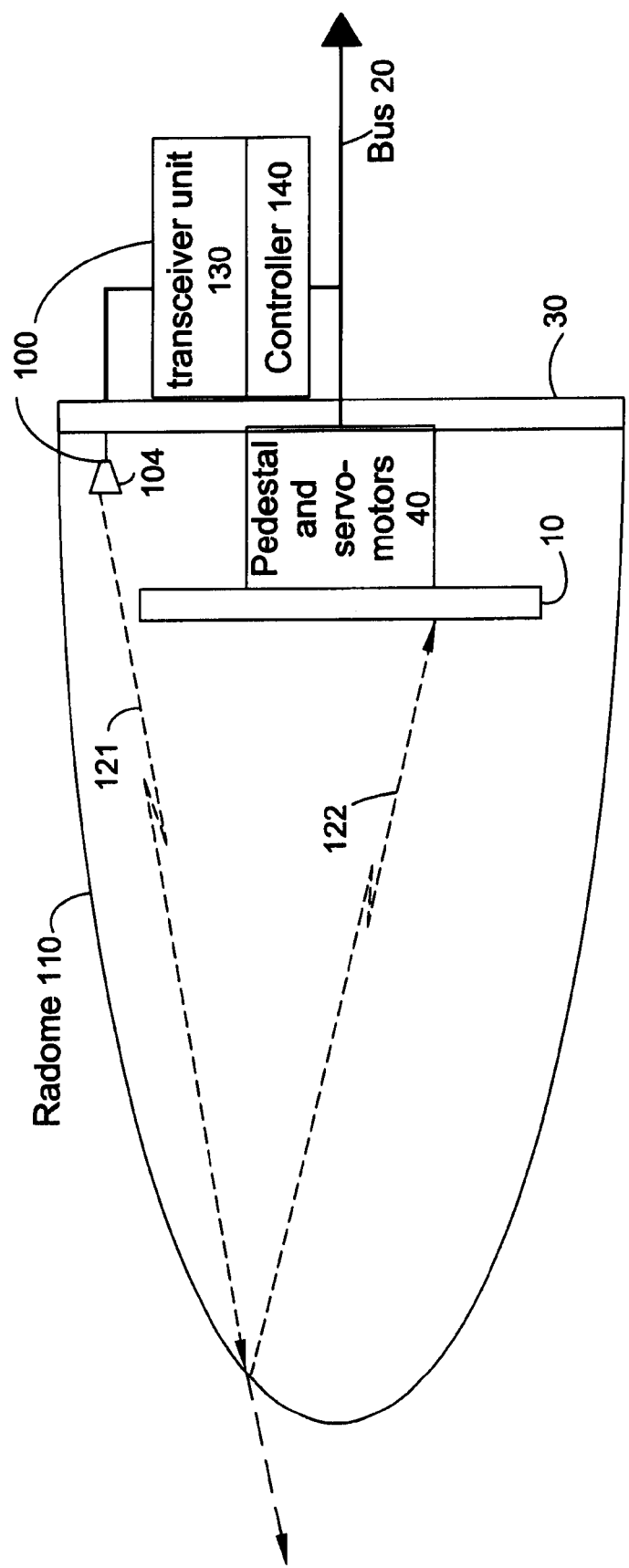

The following figures are not to scale and illustrate only some exemplary embodiments of the invention. For example, although FIGS. 1-3 illustrate an airborne configuration of the system in which the system is positioned at the front section of the aircraft, other configurations are included in the scope of the invention. For example, the system may be installed in other aircrafts, in other locations of an aircraft such as an aircraft belly. The system can be installed on naval vehicles and land vehicles, on military vehicles and on civilian vehicles. It can also be installed in various manners that do not involve a vehicle. For example, the system can be installed in a stationary manner.

FIGS. 1-3 illustrate a radar antenna 10 that is pivotally connected via a pedestal and servo-motors (collectively denoted 40) to an aircraft airframe by its bulkhead 30. The antenna 10 is illustrated as being parallel to the bulkhead 30. Those of skill in the art will appreciate that the radar antenna is not necessarily parallel to the radar antenna 10. For example, the radar antenna is usually oriented in negative angles and positive angles in relation to the bulkhead during a scan operation.

FIG. 1 illustrates an airborne radar antenna 10, a receiving antenna 102 and a transmitting antenna 104, according to an embodiment of the invention.

Airborne radar antenna 10, receiving antenna 102 and transmitting antenna 104 are connected to a vertical surface such as a bulkhead. The receiving antenna ("RX antenna") 102 and the transmitting antenna ("TX antenna") 104 are positioned within a near-field region of the antenna. These antennas (102 and 104) are positioned behind the radar antenna 10.

In the near-field region of the radar antenna 10 the radar antenna 10 acts substantially as an omni-directional antenna. The direction of a signal received by antenna 102 in the near-field is determined by knowing the direction of the radar antenna 10 when the signal is received. Thus, the timing of the transmission of such an output signal determines the direction of the signal as perceived by the radar system.

The controller 140 (of FIG. 2) receives information representative of the direction of the radar antenna at each scan step and can activate the transmission of an output signal when the radar antenna is oriented at any selected direction, such as to provide a signal representative of a virtual target at that certain direction.

The system simulates a virtual moving target by transmitting a reproduced received signal after manipulating the delay between the received and transmit signals (represent the radial range between the virtual target and the radar), the resulted Doppler shift frequency (represent the radial component of the velocity between the virtual target and the radar), the power of the received signal (as a function of the range between the target and the radar as well as the virtual target cross section.

For example, representation of radial movement may be achieved by altering the signal power, the time delay and the Doppler shift. Yet for another example, tangential (lateral) movements may be achieved by altering the timing difference between the transmission of the output signal and between the scan period of the radar antenna. Those of skill in the art will appreciate that even tangential movements may require various modulations.

It is noted that FIGS. 1-3 illustrate horn shaped antennas for antennas 102 and 104 although other antennas may be used. In addition, more than a single transmitting and/or receiving antenna may be included in the system. One or more transmitting antennas can be allocated per transmitter, and one or more receiving antennas can be allocated per receiver.

FIGS. 2-3 illustrate an airborne virtual target generator 100 and its environment, according to an embodiment of the invention.

FIG. 2 illustrates a reception sequence while FIG. 3 illustrates a transmission sequence. It is noted that the actual radiation patterns of the radar antenna 10, the receiving antenna 102 and the transmitting antenna 104 are much more complex but for simplicity of explanation the propagation of the radio frequency radiation is illustrated by dotted arrows.

During a reception sequence of system 100 the radar antenna 10 transmits radio frequency signals. Most of the radiation passes through radome 110, while some of the radiation is reflected backwards towards the receiving antenna 102, as illustrated by dotted arrows 125 and 124.

During a transmission sequence of system 100 the transmitting antenna 104 transmits radio frequency signals. Most of the radiation passes through radome 110, while some of the radiation is reflected towards the radar antenna 10, as illustrated by dotted arrows 121 and 122.

It is noted that in many cases a fraction of the radio frequency radiation transmitted from the radar antenna 10 directly reaches the receiving antenna 102 and that a fraction of the radio frequency radiation emitted from the transmitting antenna 104 reaches the radar antenna 10. This can occur due to the small distance between the radar antenna 10 and the receiving antenna 102 and the transmitting antennas 104.

The receiving antenna 102 and the transmitting antenna 104 are connected, via one or more cables or other radio frequency conveyors, to transceiver unit 130. The transceiver unit 130 is controlled by a controller 140. It is noted that both units may be integrated together, located near each other or located in different distant locations from each other.

Conveniently, both units 130 and 140 are positioned on one or more racks that are located behind bulkhead 30.

Controller 140 is connected to bus 20 and receives direction information representative of the radar antenna direction. It is noted that the direction information can have various formats. For example, the direction information can define the current (or future) scan pattern of the radar antenna, as well as timing information that indicates when the scan pattern begins (or ends). Yet for another example, the direction information can indicate the current direction of the antenna, and angular velocity of the radar antenna and the like. It is noted that the controller 140 can be adapted to manage various direction information formats.

It is noted that although controller 140 is illustrated as receiving the direction information via bus 20 (that is also connected to pedestal and servo-motors 40) that either one of the transceiver unit 130 and the controller 140 (or even both) can receive the direction information in various manners and from various components of the aircraft.

It is noted that ground based, as well as ship-borne, versions of the virtual target generator may be placed on racks, on movable or stationary platforms and the like.

The transceiver unit 130 may be any prior art transceiver that includes a digital radio frequency memory unit.

Conveniently, the digital radio frequency memory unit operates as a digital delay line.

Figure 5:
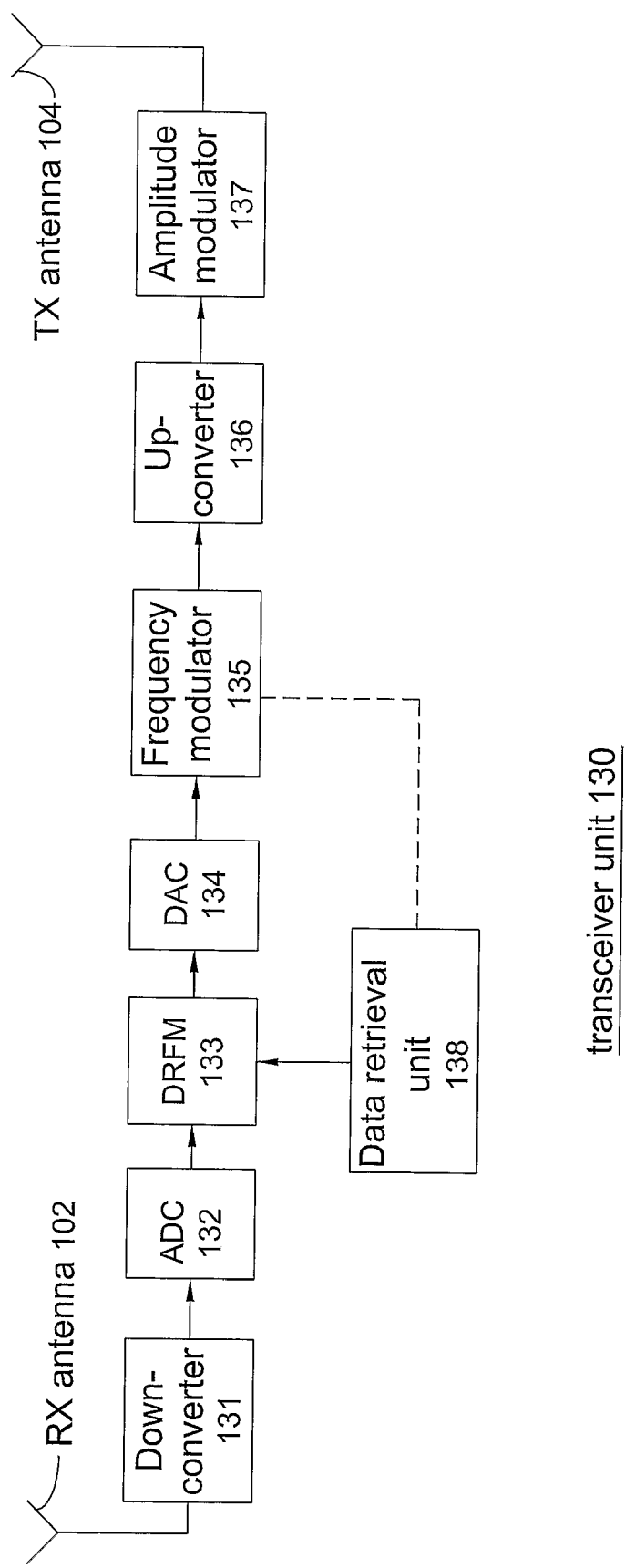
FIG. 5 illustrates an exemplary horizontal radar scan pattern, according to an embodiment of the invention.

FIG. 5 illustrates a transceiver unit 130 according to an embodiment of the invention.

Transceiver unit 130 includes a radio frequency down-converter 131, an analog to digital converter (ADC) 132, a digital radio frequency memory 133, a digital to analog converter (DAC) 134, a frequency modulator 135, an up-converter 136, an amplitude modulator 137, and data retrieval unit 138. These components or at least some of these components (especially the frequency modulator 135, the amplitude modulator 137 and the data retrieval unit 138) are controlled by controller 140.

The down-converter 131 receives a radio frequency signal from the receiving antenna 102 and converts the radio frequency signal to an intermediate frequency signal. The intermediate frequency signal is sampled by the analog to digital converter (ADC) 132 that operates at a sampling frequency that is at least twice of the intermediate frequency. The samples are stored in the digital radio frequency memory (DRFM) 133. The samples are retrieved from the digital radio frequency memory 133 by a data retrieval unit 138. The retrieved samples are provided to the digital to analog converter (DAC) 134 that outputs an intermediate frequency analog signal. This intermediate frequency signal is frequency modulated by frequency modulator 135 to emulate a Doppler shift effect. This intermediate frequency signal is up-converted by an up-converter 136 to provide a radio frequency signal. The amplitude of the radio frequency is modulated (usually attenuated) by amplitude modulator 137. The amplitude modulator 137 outputs an output signal representative of a virtual target. Those of skill in the art will appreciate that the amplitude of the output signal, and its frequency are correlated in order to generate a moving virtual target. This correlation may be achieved by using prior art methods.

In order to provide a virtual target that can perform tangential (lateral) movements as well as radial movements the timing of the retrieval and transmission of the output signal are determined in response to a scanning pattern of the radar antenna. Assuming, for example, that the radar antenna performs a horizontal scan, from right to left then in order to simulate a right movement of the virtual target, the time difference between consecutive output signals should gradually decrease. The decrement is responsive to the simulated tangential velocity of the virtual target and to the horizontal scan period of the radar antenna.

Figure 4:
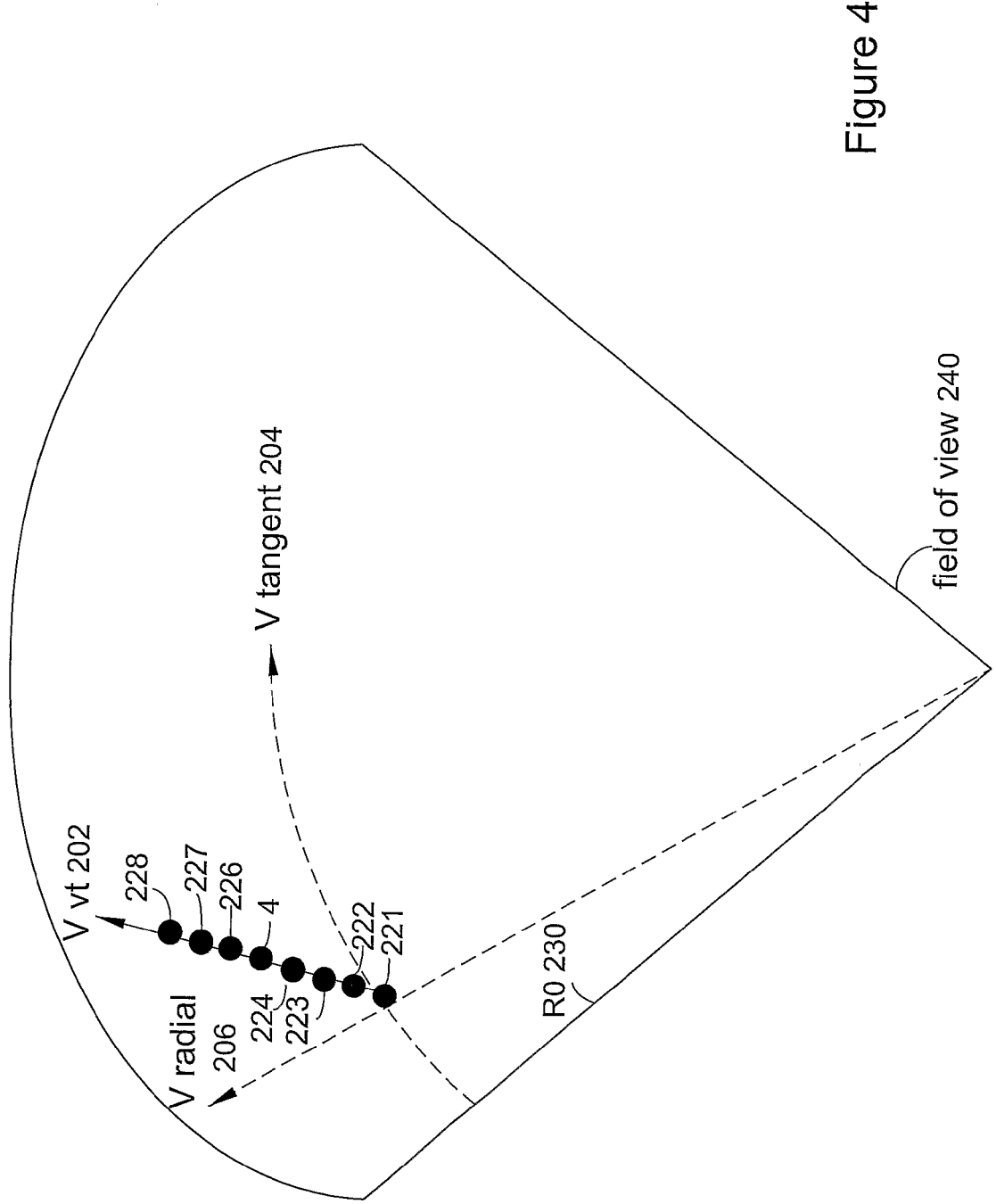
FIG. 4 illustrates a transceiver unit according to an embodiment of the invention.

FIG. 4 illustrates an azimuth scan pattern, according to an embodiment of the invention.

The azimuth scan pattern 240 includes a range of angles. A virtual target moves at a virtual target velocity (Vvt) 202 that includes radial components (Vradial 206) and a tangential component (Vtangent 204). The virtual target virtually moves from left to right, while moving away from the radar antenna. The virtual movement of the virtual target is further illustrated by multiple dots 221-228, each representing an output signal received by the radar antenna during a different scan period. The output signals are timed such as to cause the required horizontal and vertical (azimuth and elevation) movement. For example, assuming that the radar antenna scans from right to left then the time between the transmission of output signals resulting in dots 221-228 gradually decreases. On the other hand, the virtual target gradually moves away from the radar antenna, thus the two-way delay period slightly increases.

Figure 6:
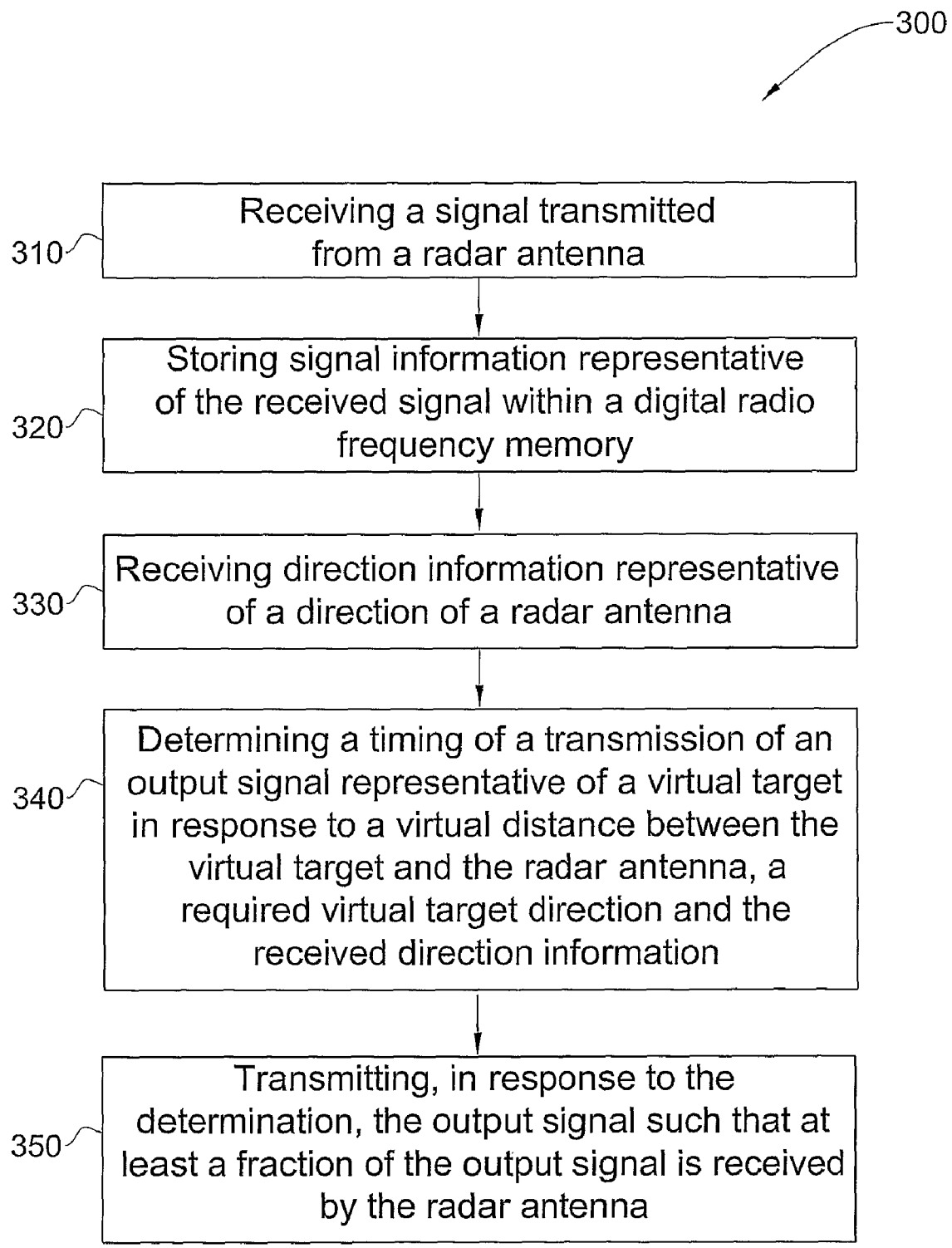
FIG. 6 is a flow chart of a method according to an embodiment of the invention.

FIG. 6 is a flow chart of method 300 according to an embodiment of the invention.

Method 300 starts by stage 310 of receiving a signal transmitted from a radar antenna. Referring to the example set forth in previous figures, the receiving antenna 102 receives a radio frequency pulse that is transmitted by radar antenna.

Stage 310 is followed by stage 320 of storing signal information representative of the received signal within a digital radio frequency memory. Referring to the examples set forth in previous figures, DRFM 133 stores information representative of the received pulse.

Stage 320 is followed by stage 330 of receiving direction information representative of a direction of a radar antenna. Referring to the examples set forth in previous figures, such information is provided to the controller over bus 20.

Stage 330 is followed by stage 340 of determining a timing of a transmission of an output signal representative of a virtual target in response to a virtual distance between the virtual target and the radar antenna, a required virtual target direction and the received direction information. Referring to the examples set forth in previous figures, the timing of the data retrieval and transmission are determined by controller 140 that (for example) can generate a virtual target that moves in a path that may be defined by points 221-228.

Stage 340 is followed by stage 350 of transmitting, in response to the determination, the output signal, such that at least a fraction of the output signal is received by the radar antenna. Referring to the examples set forth in previous figures, the transmission is made by using an output radio frequency path that includes transmitting antenna 104.

Stage 350 of transmitting may be performed by an airborne system such as system 100. For example, the transmission may be made by a transmission antenna positioned within a near-field region of the radar antenna, by a transmission antenna that is within a near-field region of radar antenna, in a space defined at least partially by a radome, and the like.

The transmission is conveniently made in the near-field of the radar antenna. The transmission can include direct transmission, reflected transmission and the like. For example the transmission may be made towards a radome that reflects at least a portion of the output signal towards the radar antenna.

It is noted that according to other embodiments of the invention the transmission may be performed by other airborne systems, naval systems, ground based systems and other mobile or stationary systems.

According to an embodiment of the invention stage 350 of transmitting includes transmitting multiple signals representative of multiple virtual targets. It is noted that the transmission of virtual signals that are oriented at different angles from the radar antenna may be done by using a single signal retrieval path. Conveniently, the simulation of multiple virtual targets that are oriented at substantially the same angle in relation to the radar antenna required multiple signal retrieval paths.

According to another embodiment of the invention the output signal of the system is not transmitted via an antenna (such as transmitting antenna 104) to be received by the radar antenna but is rather provided, via a waveguide or another radio frequency conveyor, to the receiver of the radar.

Figure 7:
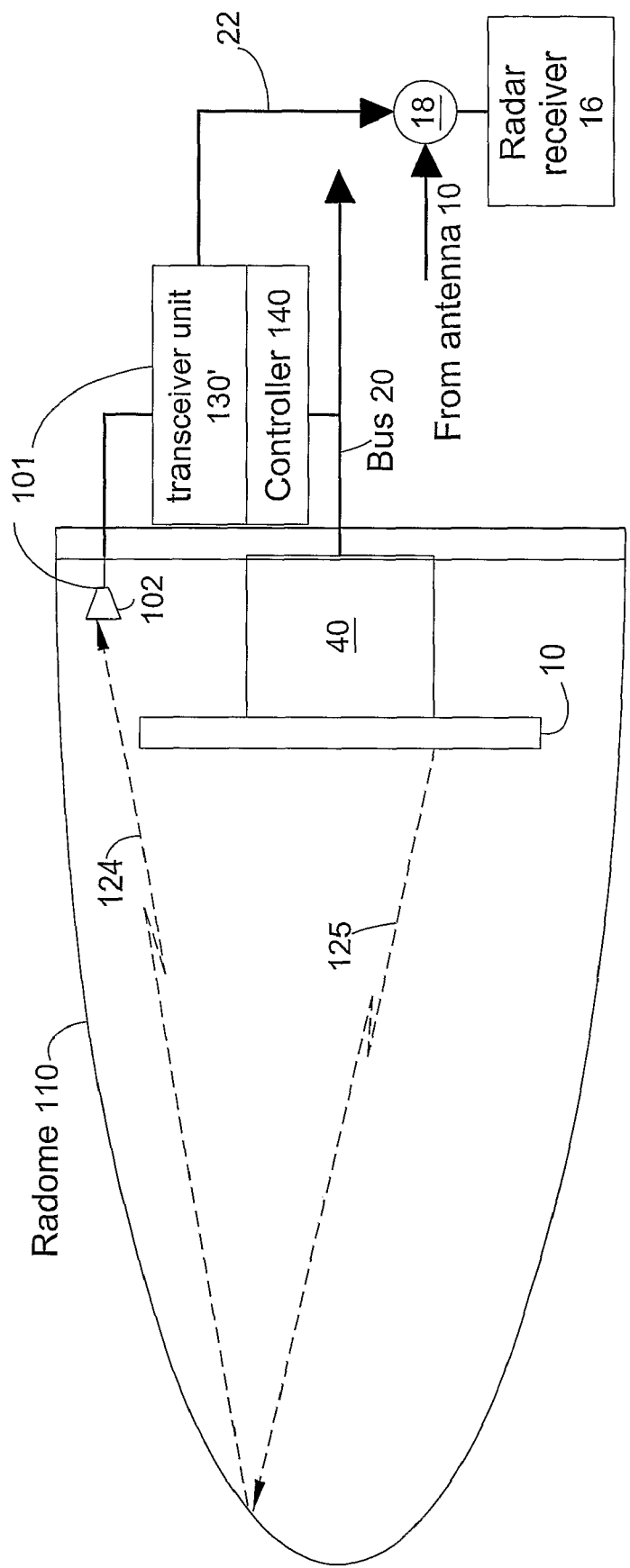
FIG. 7 illustrates a system and its environment, according to an embodiment of the invention.

FIG. 7 illustrates system 101 and its environment, according to an embodiment of the invention.

System 101 includes receiving antenna 102, transceiver unit 130' and controller 140.

Receiving antenna 102 is connected, via one or more cables or other radio frequency conveyors, to transceiver unit 130'. Transceiver unit 130' is controlled by a controller 140. It is noted that both units may be integrated together, located near each other or located in different distant locations from each other. Conveniently, both units 130' and 140 are positioned on one or more racks that are located behind bulkhead 30.

System 101 differs from system 100 of FIGS. 2-3 by not including transmitting antenna 104 and by including a transceiver unit 130' that does not transmit an output signal via transmitting antenna 104 but rather provides the output signal to radio frequency conveyor 22.

The output signal is sent (from radio frequency conveyor 22) via radio frequency switch or combiner 18 to radar receiver 16. Radar receiver 16 also receives signals from radar antenna. Switch or combiner 18 can provide to radar receiver both signals received from radar antenna 10 and from transceiver Unit 130' but can also select (for example by applying time division multiplexing) between signals received from radar antenna 10 and between the output signal provided over radio frequency conveyor 22.

Thus, system 101 utilizes a coupling between transceiver unit 130' and between radar receiver 16, while system 100 utilizes a much looser coupling between transmitting antenna 104 and radar antenna 10.

It is noted that the radio frequency conveyor 22 differs from air.

Figure 8:
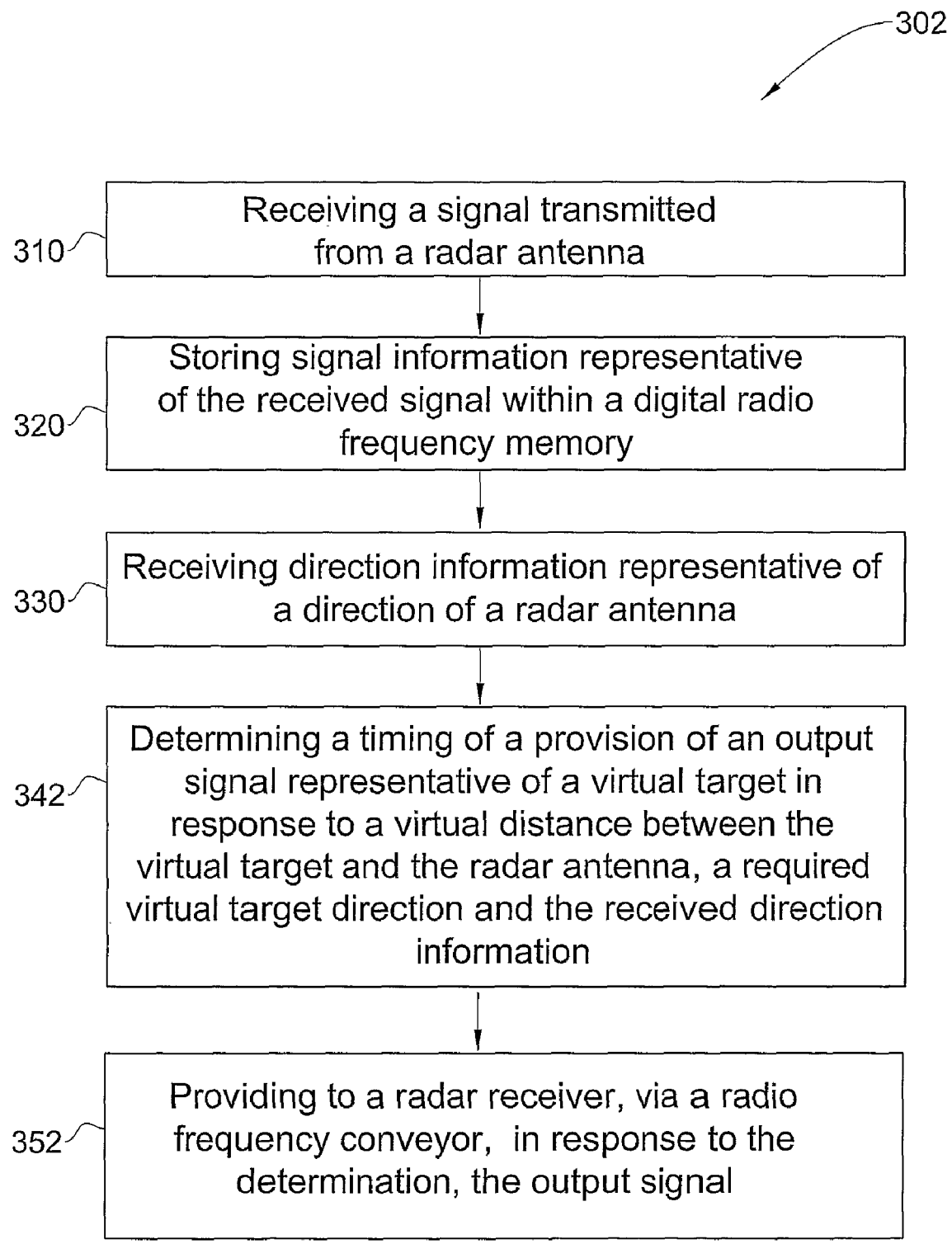
FIG. 8 is a flow chart of a method according to another embodiment of the invention.

FIG. 8 is a flow chart of method 302 according to another embodiment of the invention.

Method 302 starts at stage 310 of receiving a signal transmitted from a radar antenna. Referring to the example set forth in previous figures, the receiving antenna 102 receives a radio frequency pulse that is transmitted by radar antenna.

Stage 310 is followed by stage 320 of storing signal information representative of the received signal within a digital radio frequency memory. Referring to the examples set forth in previous figures, DRFM 133 stores information representative of the received pulse.

Stage 320 is followed by stage 330 of receiving direction information representative of a direction of a radar antenna. Referring to the examples set forth in previous figures, such information is provided to the controller over bus 20.

Stage 330 is followed by stage 342 of determining a timing of a provision to a radar receiver, via a radio frequency conveyor, of an output signal representative of a virtual target in response to a virtual distance between the virtual target and the radar antenna, a required virtual target direction and the received direction information. Referring to the examples set forth in previous figures, the timing of the data retrieval and transmission are determined by controller 140' that (for example) can generate a virtual target that moves in a path that may be defined by points 221-228.

Stage 342 is followed by stage 352 of providing, to a radar receiver, via a radio frequency conveyor, in response to the determination, the output signal. Referring to the examples set forth in FIG. 7, the provision is made through radio frequency conveyor 22, and though radio frequency combiner or switch 18.

Figure 9:
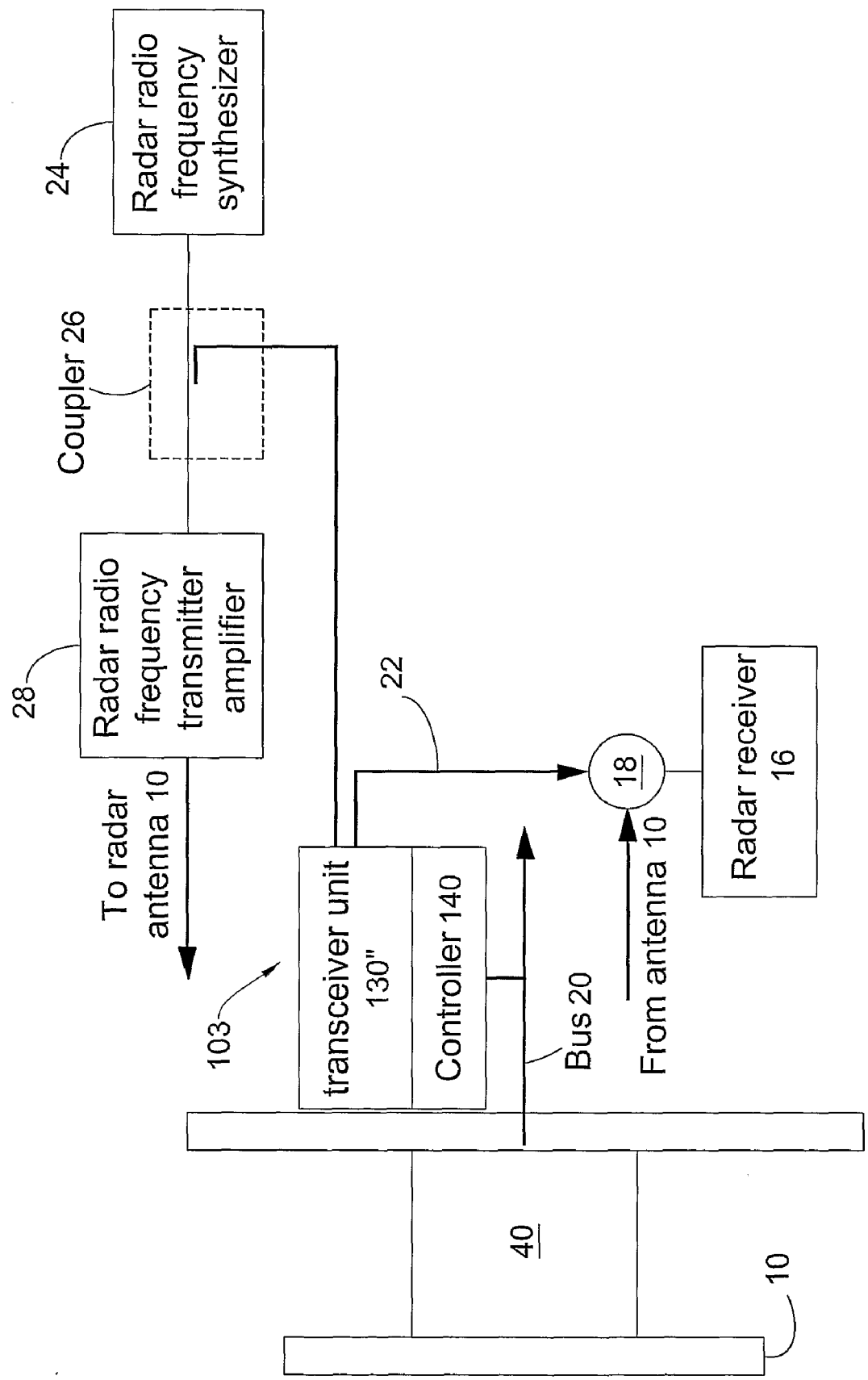
FIG. 9 illustrates a system and its environment, according to another embodiment of the invention.

FIG. 9 illustrates system 103 and its environment, according to a further embodiment of the invention.

System 103 includes transceiver unit 130" and controller 140. Transceiver unit 130" is controlled by controller 140.

Transceiver unit 130" is coupled, via radio frequency coupler 26 to the output of radar radio frequency synthesizer 24 such as to receive a sample of the radio frequency signal (such as RF pulse) sent from radar radio frequency synthesizer 24 to radar transmitter amplifier 28. Radar transmitter amplifier 28 sends an amplified radio frequency signal to radar antenna that in turn transmits the amplified radio frequency signal.

It is noted that transceiver unit 130" can receive, via a radio frequency coupler, a portion of a radio frequency signal to be transmitted by a radar antenna, wherein the radio frequency is coupled to another point within a transmission path of the radar. The transmission path includes radar radio frequency synthesizer 24, radar transmitter amplifier 28 and radar antenna 10.

Thus, instead of receiving a fraction of the amplified radio frequency signal transmitted by radar antenna, transceiver unit 130" receives a sample of the radio frequency signal before being amplified and then transmitted by radar antenna 10.

Transceiver unit 130" is also connected to radio frequency conveyor 22. Transceiver unit 130" can output an output signal representative of a virtual target to radio frequency conveyor 22. This output signal propagates through radio frequency conveyor 22, via radio frequency switch or combiner 18 until it is received by radar receiver 16. Radar receiver 16 also receives signals from radar antenna. Switch or combiner 18 can provide to radar receiver both signals received from radar antenna 10 and from transceiver unit 130' but can also select (for example by applying time division multiplexing) between signals received from radar antenna 10 and between the output signal provided over radio frequency conveyor 22.

Accordingly, system 103 does not include a receiving antenna 102 or a transmitting antenna 104.

Figure 10:
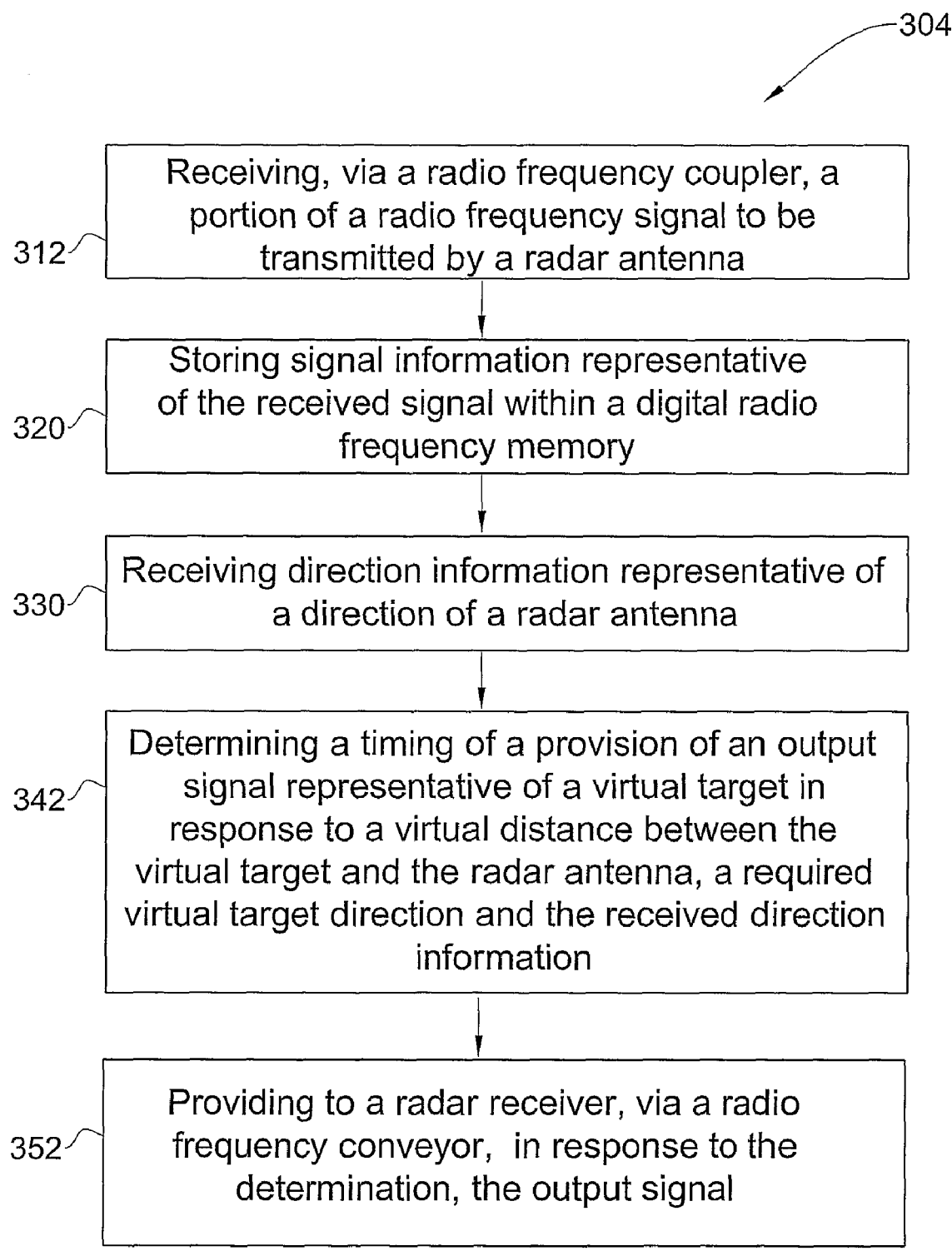
FIG. 10 is a flow chart of a method according to another embodiment of the invention.

FIG. 10 is a flow chart of method 304 according to another embodiment of the invention.

Method 304 starts by stage 312 of receiving, via a radio frequency coupler, a portion of a radio frequency signal to be transmitted by a radar antenna. Referring to the example set forth in FIG. 9, transceiver unit 130" receives a portion of the radio frequency signal (such as RF pulse) sent from radar radio frequency synthesizer 24 to radar transmitter amplifier 28.

Stage 312 is followed by stage 320 of storing signal information representative of the received signal within a digital radio frequency memory. Referring to the examples set forth in previous figures, DRFM 133 stores information representative of the received pulse.

Stage 320 is followed by stage 330 of receiving direction information representative of a direction of a radar antenna. Referring to the examples set forth in previous figures, such information is provided to the controller over bus 20.

Stage 330 is followed by stage 342 of determining a timing of a provision to a radar receiver, via a radio frequency conveyor, of an output signal representative of a virtual target in response to a virtual distance between the virtual target and the radar antenna, a required virtual target direction and the received direction information. Referring to the examples set forth in previous figures, the timing of the data retrieval and transmission are determined by controller 140' that (for example) can generate a virtual target that moves in a path that may be defined by points 221-228.

Stage 342 is followed by stage 352 of providing, to a radar receiver, via a radio frequency conveyor, in response to the determination, the output signal. Referring to the examples set forth in FIG. 7, the provision is made through radio frequency conveyor 22, and through radio frequency combiner or switch 18.

Figure 11:
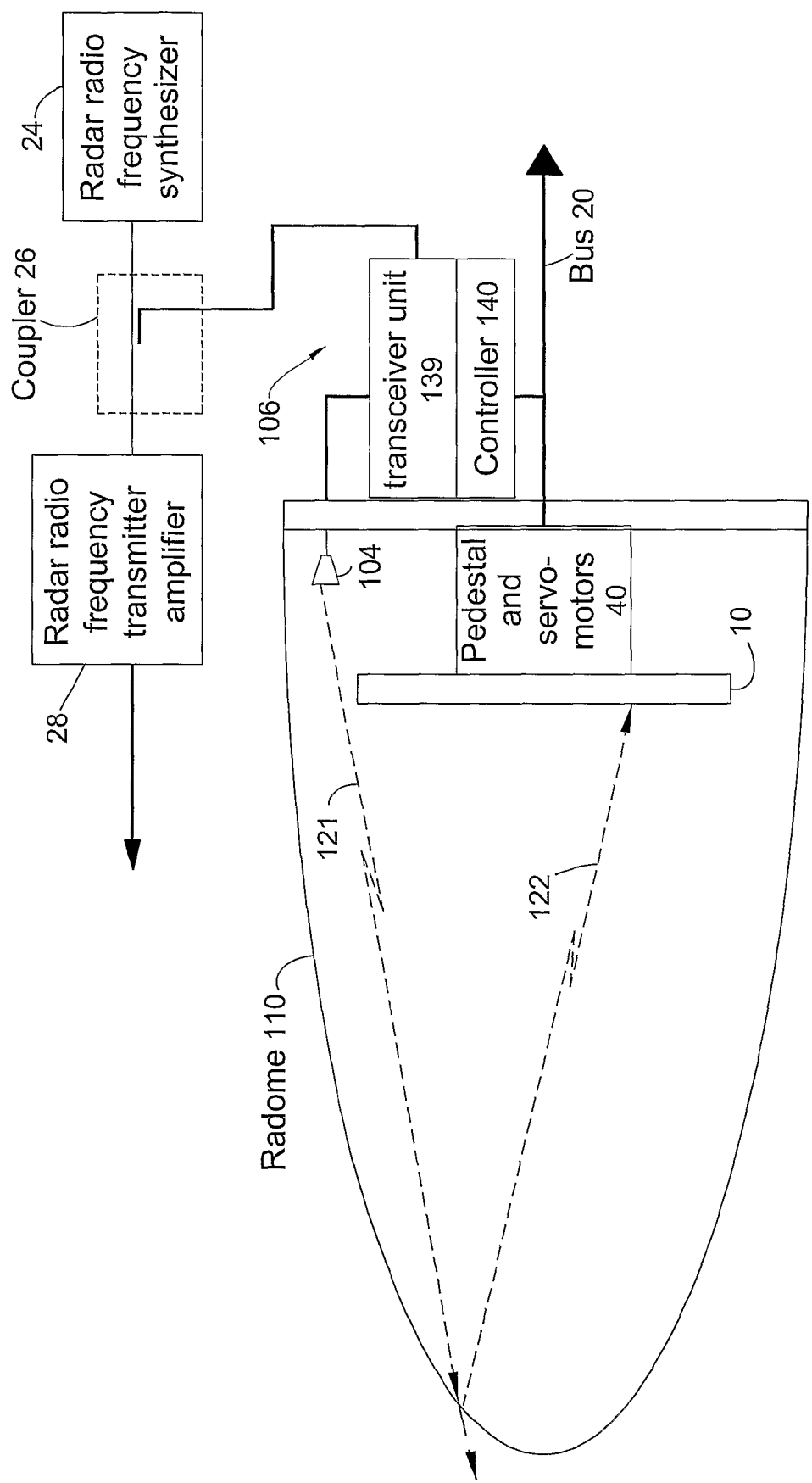
FIG. 11 illustrates a system and its environment, according to a further embodiment of the invention.

FIG. 11 illustrates system 106 and its environment, according to a further embodiment of the invention.

System 106 includes transceiver unit 139 and controller 140. Transceiver unit 139 is coupled, via radio frequency coupler 26 to the output of radar radio frequency synthesizer 24 such as to receive a sample of the radio frequency signal sent from radar radio frequency synthesizer 24 to radar transmitter amplifier 28. Radar transmitter amplifier 28 sends an amplified radio frequency signal to radar antenna that in turn transmits the amplified radio frequency signal.

Thus, instead of receiving a fraction of the amplified radio frequency signal transmitted by radar antenna, transceiver unit 139 receives a sample of the radio frequency signal before being amplified and then transmitted by radar antenna 10. Accordingly, system 106 does not include a receiving antenna 102.

Output signals of transceiver 139 are transmitted via transmission antenna 104 to be partially received by radar antenna.

Figure 12:
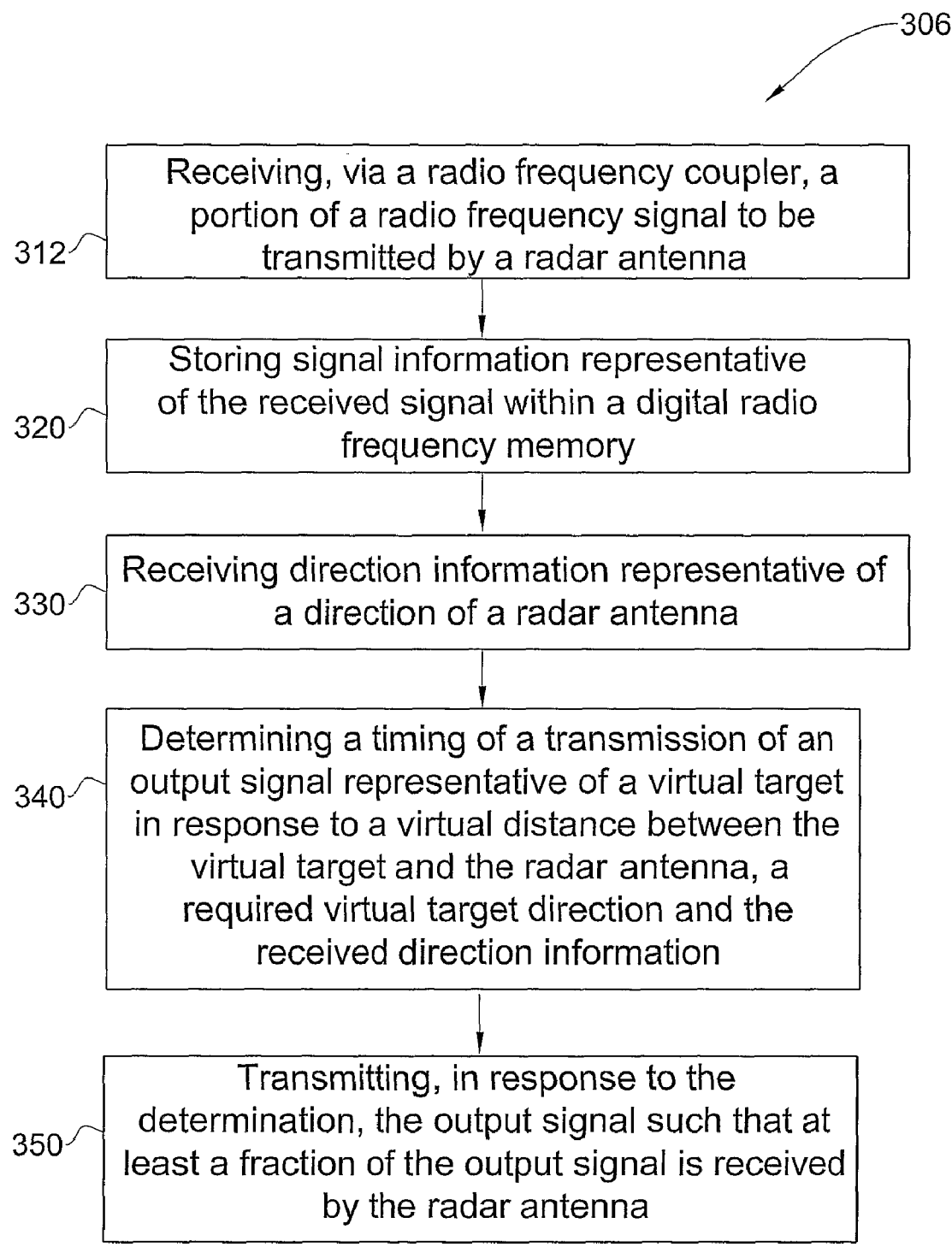
FIG. 12 is a flow chart of a method according to further embodiment of the invention.

FIG. 12 is a flow chart of method 306 according to another embodiment of the invention.

Method 306 starts by stage 312 of receiving, via a radio frequency coupler, a portion of a radio frequency signal sent from a radar frequency amplifier to a radar transmitter amplifier. Referring to the example set forth in FIG. 11, transceiver unit 139 receives a portion of the radio frequency signal (such as RF pulse) sent from radar radio frequency synthesizer 24 to radar transmitter amplifier 28.

Stage 310 is followed by stage 320 of storing signal information representative of the received signal within a digital radio frequency memory. Referring to the examples set forth in previous figures, DRFM 133 stores information representative of the received pulse.

Stage 320 is followed by stage 330 of receiving direction information representative of a direction of a radar antenna. Referring to the examples set forth in previous figures, such information is provided to the controller over bus 20.

Stage 330 is followed by stage 340 of determining a timing of a transmission of an output signal representative of a virtual target in response to a virtual distance between the virtual target and the radar antenna, a required virtual target direction and the received direction information. Referring to the examples set forth in previous figures, the timing of the data retrieval and transmission are determined by controller 140 that (for example) can generate a virtual target that moves in a path that may be defined by points 221-228.

Stage 340 is followed by stage 350 of transmitting, in response to the determination, the output signal such that at least a fraction of the output signal is received by the radar antenna. Referring to the examples set forth in FIG. 11, the transmission is made by using an output radio frequency path that includes transmitting antenna 104.

While the invention has been described with respect to a limited number of embodiments, it will be appreciated that many variations, modifications and other applications of the invention may be made.

I claim:

1. A virtual radar target generator, comprising:
a transceiver and a controller coupled to the transceiver,
wherein the transceiver is adapted to receive a signal transmitted from a radar antenna, store signal information representative of the received signal within a digital radio frequency memory and transmit an output signal representative of a virtual target such that at least a fraction of the output signal is received by the radar antenna;
wherein the controller is adapted to determine a timing of the transmission of the output signal in response to a virtual distance between the virtual target and the radar antenna, a required virtual target direction and direction information representative of a direction of the radar antenna;
wherein the transceiver further comprises a transmission antenna, the transmission antenna and the radar antenna being positioned within a space that is at least partially defined by a radome, and
wherein the transmission antenna transmits the output signal towards the radome such that at least a fraction of the output signal is reflected towards the radar antenna.

2. The virtual target generator according to claim 1, wherein the transceiver is an airborne transceiver and wherein the radar antenna is an airborne antenna.

3. The virtual target generator according to claim 1, wherein the transceiver comprises a reception antenna; wherein the reception antenna and the radar antenna are positioned within a space that is at least partially defined by the radome.

4. The virtual target generator according to claim 1, wherein the system is adapted to transmit multiple signals representative of multiple virtual targets.

5. The virtual target generator according to claim 1, wherein the transmission and/or receiving antenna is connected to the radome or anywhere within a near-field of the radar antenna.

6. The virtual target generator according to claim 1, wherein the transmission antenna is placed beyond the radar antenna.

7. The virtual target generator according to claim 1, further adapted to generate virtual targets that perform movements that have a tangential component in relation to the radar antenna.

8. A method for simulating virtual targets, comprising:
receiving a signal transmitted from a radar antenna;
storing signal information representative of the received signal within a digital radio frequency memory;
receiving direction information representative of a direction of the radar antenna;
determining a timing of a transmission of an output signal representative of a virtual target in response to a virtual distance between the virtual target and the radar antenna, a required virtual target direction and the received direction information; and
transmitting, in response to the determining of the timing, the output signal such that at least a fraction of the output signal is received by the radar antenna;
wherein the transmitting comprises transmitting the output signal by a transmission antenna;
wherein the transmission antenna and the radar antenna are positioned within a space that is at least partially defined by a radome; and
wherein the transmitting comprises transmitting the output signal towards the radome such that at least a fraction of the output signal is reflected towards the radar antenna.

9. The method according to claim 8, wherein the transmitting comprises transmitting the output signal by an airborne transceiver.

10. The method according to claim 8, wherein the transmitting comprises transmitting multiple signals representative of multiple virtual targets.

11. The method according to claim 8, wherein the determining of the timing is responsive to a required virtual movement that comprises a tangential component in relation to the radar antenna.

12. A virtual radar target generator, comprising:
a transceiver and a controller coupled to the transceiver;
wherein the transceiver comprises a transmission antenna, and the transceiver is adapted to receive, via a radio frequency coupler, a portion of a radio frequency signal to be transmitted by a radar antenna, store signal information representative of the received signal within a digital radio frequency memory, and transmit an output signal representative of a virtual target such that at least a fraction of the output is received by the radar antenna;
wherein the controller is adapted to determine a timing of the transmission of the output signal in response to a virtual distance between the virtual target and the radar antenna, a required virtual target direction and direction information representative of a direction of the radar antenna;

wherein the transmission antenna and the radar antenna are positioned within a space that is at least partially defined by a radome; and wherein the transmission antenna transmits the output signal towards the radome such that at least a fraction of the output signal is reflected towards the radar antenna.

13. The virtual target generator according to claim 12, wherein the transceiver is an airborne transceiver and wherein the radar antenna is an airborne antenna.

14. The virtual target generator according to claim 12, wherein the system is adapted to transmit multiple signals representative of multiple virtual targets.

15. The virtual target generator according to claim 12, further adapted to generate virtual targets that perform movements that have a tangential component in relation to the radar antenna.

16. A method for simulating virtual targets, comprising:
receiving, via a radio frequency coupler, a portion of a radio frequency signal to be transmitted by a radar antenna;
storing signal information representative of the received signal within a digital radio frequency memory;
receiving direction information representative of a direction of the radar antenna;
determining a timing of a transmission of an output signal representative of a virtual target in response to a virtual distance between the virtual target and the radar antenna, a required virtual target direction and the received direction information; and
transmitting, in response to the determining of the timing, the output signal such that at least a fraction of the output signal is received by the radar antenna;
wherein the transmission antenna and the radar antenna are positioned within a space that is at least partially defined by a radome; and
wherein the transmitting comprises transmitting the output signal towards the radome such that at least a fraction of the output signal is reflected towards the radar antenna.

17. The method according to claim 16, wherein the transmitting comprises transmitting the output signal by an airborne transceiver.

18. The method according to claim 16, wherein the transmitting comprises transmitting multiple signals representative of multiple virtual targets.

19. The method according to claim 16, wherein the determining of the timing is responsive to a required virtual movement that comprises a tangential component in relation to the radar antenna.

* * * * *